（12）United States Patent
Liu et al.

(10) Patent No.: US 12,552,451 B2
(45) Date of Patent: Feb. 17, 2026

(54) STEER-BY-WIRE SYSTEM, STEER-BY-WIRE CONTROL APPARATUS, AND STEER-BY-WIRE CONTROL METHOD

(71) Applicant: HITACHI ASTEMO, LTD., Hitachinaka (JP)

(72) Inventors: Huajun Liu, Hitachinaka (JP); Yasuhito Nakakuki, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 140 days.

(21) Appl. No.: 18/569,552

(22) PCT Filed: Jun. 1, 2022

(86) PCT No.: PCT/JP2022/022307
§ 371 (c)(1),
(2) Date: Dec. 12, 2023

(87) PCT Pub. No.: WO2022/264812
PCT Pub. Date: Dec. 22, 2022

(65) Prior Publication Data
US 2024/0278824 A1    Aug. 22, 2024

(30) Foreign Application Priority Data

Jun. 16, 2021    (JP) .................................. 2021-099993

(51) Int. Cl.
*B62D 6/00*    (2006.01)
*B62D 5/00*    (2006.01)

(52) U.S. Cl.
CPC ............. *B62D 6/008* (2013.01); *B62D 5/006* (2013.01)

(58) Field of Classification Search
CPC ................................ B62D 5/006; B62D 6/008
See application file for complete search history.

(56) References Cited

U.S. PATENT DOCUMENTS

2019/0367075 A1*  12/2019  Kodera ................. B62D 5/003
2023/0234641 A1*  7/2023   Akatsuka .............. B62D 7/159
                                                              701/41

FOREIGN PATENT DOCUMENTS

| JP | 05-178226 A | 7/1993 |
| JP | H10-062311 A | 3/1998 |
| JP | 2003-252229 A | 9/2003 |

(Continued)

OTHER PUBLICATIONS

ITO, JP 2005-219552, machine translation. (Year: 2005).*

(Continued)

*Primary Examiner* — Mark L. Greene
(74) *Attorney, Agent, or Firm* — FOLEY & LARDNER LLP

(57) ABSTRACT

In one mode of a steer-by-wire system, a steer-by-wire control apparatus, and a steer-by-wire control method according to the present invention, when a vehicle is undergoing skid, a reaction force generation apparatus decreases or increases reaction force torque from basic reaction force torque calculated from a steering angle of a steering wheel, based on the steering angle, a vehicle speed of the vehicle, and motor torque of a turning motor, and outputs the calculated reaction force torque as skid reaction force torque. In this way, the driver can be appropriately notified of a vehicle skid state via the steering wheel.

10 Claims, 7 Drawing Sheets

(56) References Cited

FOREIGN PATENT DOCUMENTS

| | | | | | |
|---|---|---|---|---|---|
| JP | 2005219552 A | * | 8/2005 | | |
| JP | 2010-188883 A | | 9/2010 | | |
| KR | 20220003474 A | * | 1/2022 | ............ | B60W 40/06 |

OTHER PUBLICATIONS

Hong, KR 2022-0003474, machine translation. (Year: 2022).*
International Preliminary Report on Patentability dated Dec. 28, 2023 issued in International Application No. PCT/JP2022/022307, with English translation, 12 pages.
International Search Report dated Aug. 2, 2022 issued in International Application No. PCT/JP2022/022307, with English translation, 5 pages.

* cited by examiner

STEER-BY-WIRE SYSTEM, STEER-BY-WIRE CONTROL APPARATUS, AND STEER-BY-WIRE CONTROL METHOD

TECHNICAL FIELD

The present invention relates to a steer-by-wire system, to a steer-by-wire control apparatus, and to a steer-by-wire control method.

BACKGROUND ART

A vehicle steering control apparatus in Patent Document 1 controls the turning of steered road wheels via a turning actuator by using a target turning angle calculated based on the steering angle of a steering wheel as a target value. When the lateral acceleration is equal to or greater than a predetermined threshold, the vehicle steering control apparatus limits change in target turning angle with respect to change in steering angle, compared with a case in which the lateral acceleration is less than the predetermined threshold.

REFERENCE DOCUMENT LIST

Patent Document

Patent Document 1: JP 2010-188883 A

SUMMARY OF THE INVENTION

Problem to be Solved by the Invention

There is known a steer-by-wire system including a steering apparatus that is capable of steering steered road wheels through an operation of a turning motor and a reaction force generation apparatus that is capable of adding reaction force torque to a steering wheel through an operation of a reaction force motor. The steering apparatus and the reaction force generation apparatus are mechanically separate from each other. One of the challenges regarding this steer-by-wire system is to notify the driver of a vehicle state more effectively through control of the reaction force torque.

In particular, appropriately notifying the driver of a vehicle skid state via the steering wheel leads to improvement in vehicle safety.

The present invention has been made in view of actual circumstances, and an object of the present invention is to provide a steer-by-wire system, a steer-by-wire control apparatus, and a steer-by-wire control method that can appropriately notify a driver of a vehicle skid state via a steering wheel.

Means for Solving the Problem

According to one mode of the present invention, when a vehicle is undergoing skid, a reaction force generation apparatus decreases or increases reaction force torque from basic reaction force torque calculated from a steering angle of a steering wheel, based on the steering angle, a vehicle speed of the vehicle, and motor torque of a turning motor, and outputs the calculated reaction force torque as skid reaction force torque.

Effects of the Invention

According to the present invention, a driver can be appropriately notified of a vehicle skid state via a steering wheel.

MODE FOR CARRYING OUT THE INVENTION

Hereinafter, examples of a steer-by-wire system, a steer-by-wire control apparatus, and a steer-by-wire control method according to the present invention will be described with reference to the drawings.

Figure 1:
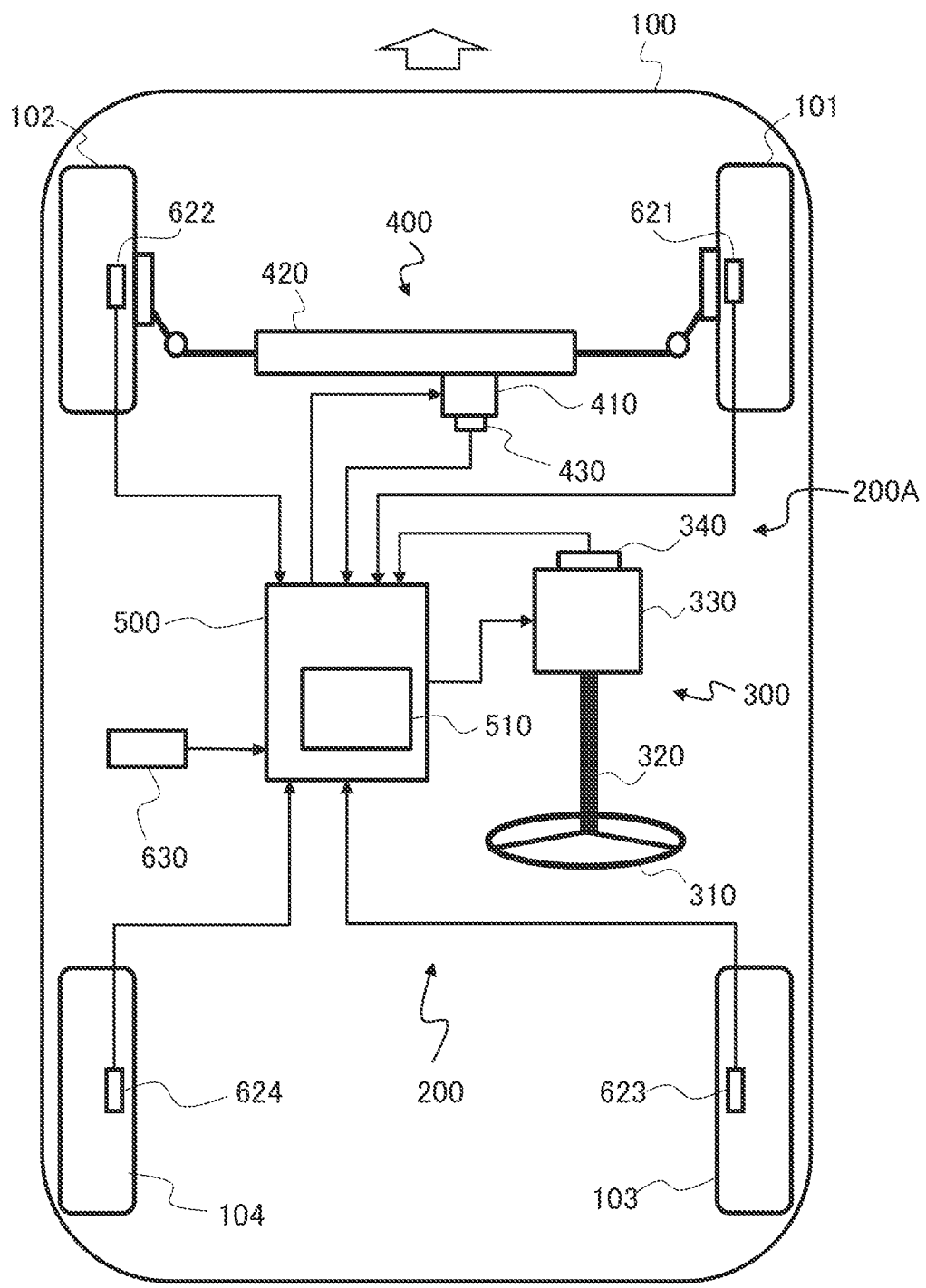
FIG. 1 illustrates an outline of a steer-by-wire system.

FIG. 1 illustrates an outline of a configuration of a steer-by-wire system 200 installed in a vehicle 100, which is a four-wheel vehicle.

Steer-by-wire system 200 includes a steer-by-wire 200A (in other words, steer-by-wire steering apparatus) including a reaction force generation apparatus 300 and a steering apparatus 400, which are mechanically separate from each other, and includes a control apparatus 500 for controlling steer-by-wire 200A.

Reaction force generation apparatus 300 includes a steering wheel 310, a steering shaft 320, a reaction force motor 330, and a steering angle sensor 340.

Reaction force generation apparatus 300 is an apparatus that can add reaction force torque (in other words, steering reaction force torque) to steering wheel 310 through an operation of reaction force motor 330.

Since steer-by-wire 200A includes reaction force generation apparatus 300, steering wheel 310 is rotated based on the difference between the operation torque generated when the driver of vehicle 100 steers steering wheel 310 and the reaction force torque generated by reaction force motor 330.

Steering angle sensor 340 detects the rotation angle of steering shaft 320 as a steering angle θ of steering wheel 310.

For example, when steering wheel 310 is in a neutral position, steering angle sensor 340 detects that steering angle θ is zero. Steering angle θ in the right direction is represented by a positive value, and steering angle θ in the left direction is represented by a negative value.

Steering apparatus 400 includes a turning motor 410, a steering mechanism 420 that steers front wheels 101 and 102, which are the steered road wheels, through turning motor 410. Steering apparatus 400 also includes a turning angle sensor 430 that detects a turning angle δ of front wheels 101 and 102 (in other words, the front tires turning angle) from the position of turning motor 410 (or the position of steering mechanism 420).

Steering apparatus 400 can steer front wheels 101 and 102, which are the steered road wheels, through an operation of turning motor 410.

Control apparatus 500 is an electronic control apparatus including a microcomputer 510 as a main component including a microprocessor unit (MPU), a read-only memory (ROM), and a random-access memory (RAM).

Control apparatus 500 performs arithmetic processing on various kinds of signals acquired from the outside, calculates a control signal for reaction force motor 330 and a control signal for turning motor 410, and outputs these calculated control signals to reaction force motor 330 and turning motor 410.

In addition, vehicle 100 includes wheel speed sensors 621 to 624 that detect the wheel speed, which is the rotation speed of vehicle wheels 101 to 104.

Vehicle 100 also includes a lateral acceleration sensor 630 that detects the lateral acceleration (in other words, actual lateral acceleration) of vehicle 100.

Control apparatus 500 acquires detected signals that are output from steering angle sensor 340, turning angle sensor 430, wheel speed sensors 621 to 624, and lateral acceleration sensor 630.

That is, control apparatus 500 acquires, for example, information about steering angle θ of steering wheel 310, information about turning angle δ of front wheels 101 and 102, which are the steered road wheels, information about the wheel speed, and information about the lateral acceleration of vehicle 100 from various sensors.

Control apparatus 500 calculates a vehicle speed V of vehicle 100 based on information about the wheel speed of each of vehicle wheels 101 to 104.

Control apparatus 500 calculates information about a target turning angle δtg based on a detected value of steering angle θ of steering wheel 310 and a setting value of a steering gear ratio Kg.

Next, control apparatus 500 calculates a control signal (in other words, a motor operation amount) that is output to turning motor 410 such that turning angle δ of front wheels 101 and 102 approximates target turning angle δtg, and outputs the calculated control signal to turning motor 410.

Steering gear ratio Kg used by control apparatus 500 to calculate target turning angle δtg is a proportionality constant in a relational expression between steering angle θ of steering wheel 310 and turning angle δ of front wheels 101 and 102. Steering gear ratio Kg is defined as follows in the present application.

$$Kg = \theta/\delta$$

Steering gear ratio Kg is a value that is freely settable in steer-by-wire system 200, and control apparatus 500 variably sets steering gear ratio Kg based on, for example, vehicle speed V.

Hereinafter, control of reaction force generation apparatus 300 performed by control apparatus 500, that is, control of the reaction force torque generated by reaction force generation apparatus 300, will be described in detail.

When vehicle 100 is undergoing skid, control apparatus 500 controls the reaction force torque generated by reaction force generation apparatus 300 by decreasing or increasing the reaction force torque from the basic reaction force torque calculated from steering angle θ, based on steering angle θ, vehicle speed V, and the motor torque of turning motor 410. Next, control apparatus 500 notifies the driver of the skid state of vehicle 100 via steering wheel 310.

That is, when vehicle 100 is undergoing skid, reaction force generation apparatus 300 decreases or increases the reaction force torque from the basic reaction force torque calculated from steering angle θ, based on steering angle θ, vehicle speed V, and the motor torque of turning motor 410, and outputs the resultant reaction force torque as skid reaction force torque.

In other words, when vehicle 100 is undergoing skid, control apparatus 500 decreases or increases the reaction force torque from the reaction force torque corresponding to when vehicle 100 is not undergoing skid, based on the magnitude of the skid calculated based on steering angle θ, vehicle speed V, and the motor torque of turning motor 410.

Figure 2:
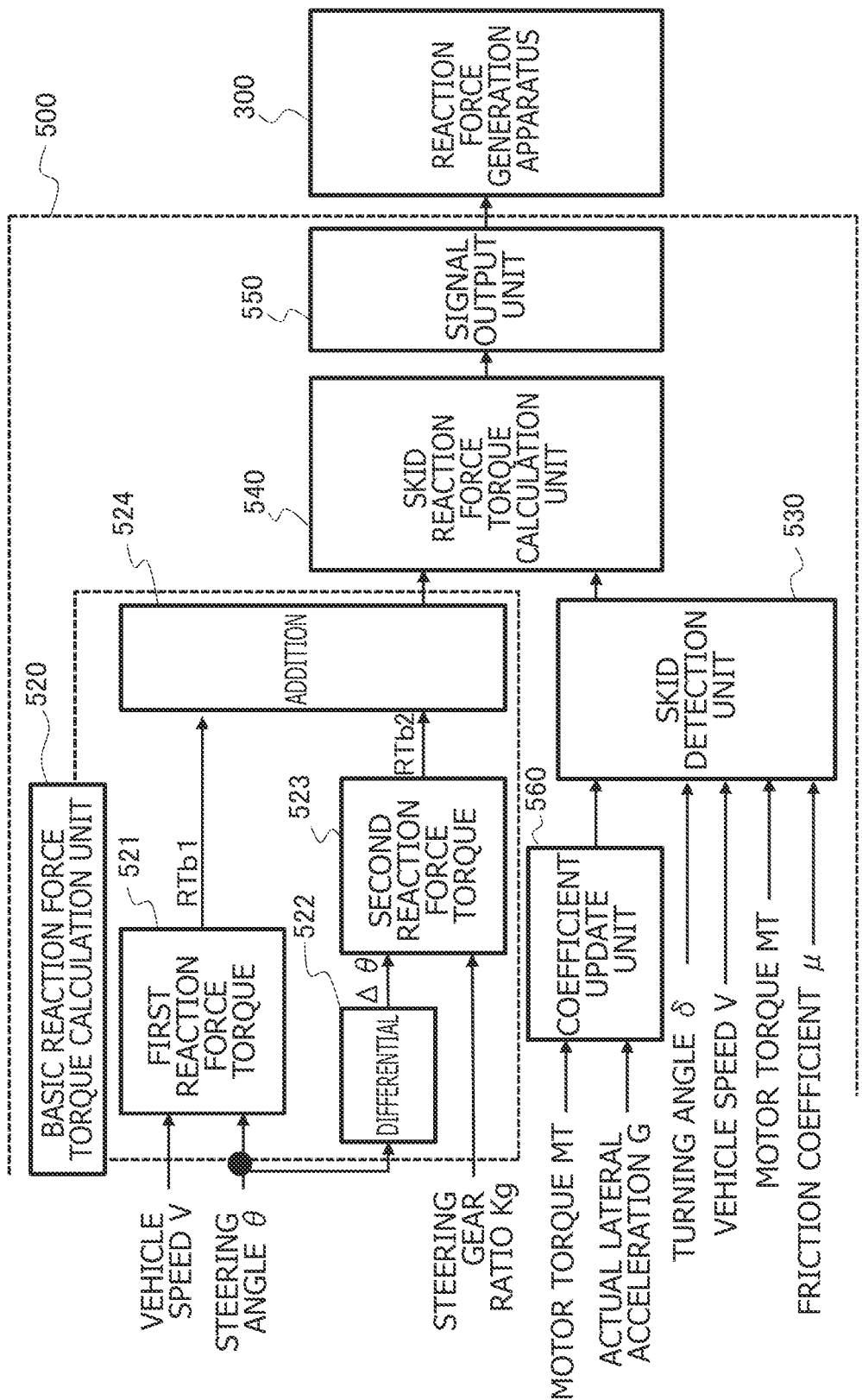
FIG. 2 is a functional block diagram of a control apparatus.

FIG. 2 is a functional block diagram for reaction force torque control performed by control apparatus 500.

Control apparatus 500 includes a basic reaction force torque calculation unit 520, a skid detection unit 530, a skid reaction force torque calculation unit 540, a signal output unit 550, and a coefficient update unit 560.

Basic reaction force torque calculation unit 520 calculates information about basic reaction force torque RTb from steering angle θ of steering wheel 310, etc.

Skid detection unit 530 detects whether or not vehicle 100 is undergoing skid, based on steering angle θ (or turning angle δ), vehicle speed V, and motor torque MT of turning motor 410.

As will be described below in detail, skid detection unit 530 calculates a nonlinearity N [Nm], which is an index value of the skid state of the tires of front wheels 101 and 102 (in other words, a tire state), by using steering angle θ (or turning angle δ), vehicle speed V, motor torque MT, and a conversion coefficient K updated and set by coefficient update unit 560.

Skid detection unit 530 can estimate motor torque MT from current data of turning motor 410. In other words, skid detection unit 530 can acquire current data of turning motor 410 as data relating to motor torque MT.

Skid reaction force torque calculation unit 540 acquires nonlinearity N calculated by skid detection unit 530 and basic reaction force torque RTb calculated by basic reaction force torque calculation unit 520.

When vehicle 100 is undergoing skid, skid reaction force torque calculation unit 540 outputs a result obtained by performing decrease or increase correction on basic reaction force torque RTb based on nonlinearity N, as a final target reaction force torque RT (in other words, a command value indicating the skid reaction force torque).

When vehicle 100 is not undergoing skid, skid reaction force torque calculation unit 540 outputs basic reaction force torque RTb as final target reaction force torque RT.

Signal output unit 550 acquires a signal indicating target reaction force torque RT (in other words, a command value indicating the reaction force torque or a control command supplied to reaction force motor 330) from skid reaction force torque calculation unit 540, and outputs a control signal to reaction force generation apparatus 300 such that reaction force generation apparatus 300 can generate target reaction force torque RT.

In one mode, basic reaction force torque calculation unit 520 includes a first reaction force torque calculation unit 521, a differential unit 522, a second reaction force torque calculation unit 523, and an addition unit 524.

First reaction force torque calculation unit 521 calculates information about first basic reaction force torque RTb1 from information about steering angle θ and information about vehicle speed V.

Differential unit 522 acquires information about a steering angle rate Δθ by differentiating the information about steering angle θ with respect to time.

Second reaction force torque calculation unit 523 calculates information about second basic reaction force torque RTb2 from the information about steering angle rate Δθ and information about steering gear ratio Kg.

Next, addition unit 524 adds up the information about first basic reaction force torque RTb1 and the information about second basic reaction force torque RTb2, and outputs the sum as the information about basic reaction force torque RTb (RTb=RTb1+RTb2).

Skid detection unit 530 acquires information about steering angle θ (or turning angle δ), vehicle speed V, conversion coefficient K, motor torque MT of turning motor 410, and a friction coefficient μ of the road surface on which vehicle 100 is running.

As expressed by Equation 1, conversion coefficient K is a proportionality constant in a relational expression of actual lateral acceleration $G_0$ detected by lateral acceleration sensor 630 and motor torque $MT_0$ of turning motor 410 obtained when vehicle 100 is not undergoing skid.

$$K = MT_0/G_0 \quad \text{[Equation 1]}$$

Skid detection unit 530 calculates nonlinearity N in accordance with Equation 2 based on conversion coefficient K, virtual lateral acceleration $G_1$ (a reference lateral acceleration), and actual motor torque $MT_1$ of turning motor 410 (in other words, self-aligning torque).

$$N = K \times G_1 - MT_1 \quad \text{[Equation 2]}$$

Skid detection unit 530 calculates virtual lateral acceleration $G_1$ in accordance with Equation 3 based on turning angle δ, which varies with steering angle θ, and based on vehicle speed V.

$$G_1 = \frac{1}{1+AV^2} \frac{V^2}{L} \delta \quad \text{[Equation 3]}$$

In Equation 3, "A" represents a stability factor of vehicle 100, and "L" represents the wheelbase.

Equation 3 is for calculating the lateral acceleration, assuming that the tires generate any amount of lateral force in proportion to the tire slip angle.

That is, skid detection unit 530 calculates virtual lateral acceleration $G_1$ generated when vehicle 100 is not undergoing skid, and calculates virtual motor torque $MT_0$, which is motor torque MT generated when vehicle 100 is not undergoing skid, by multiplying virtual lateral acceleration $G_1$ by conversion coefficient K.

Skid detection unit 530 calculates a result obtained by subtracting actual motor torque $MT_1$ from virtual motor torque $MT_0$ generated when vehicle 100 is not undergoing skid, that is, calculates the difference between virtual motor torque $MT_0$ and actual motor torque $MT_1$, as nonlinearity N ($N=MT_0-MT_1$).

Thus, when vehicle 100 is not undergoing skid, that is, in a linear area in which the actual lateral acceleration increases as turning angle δ (or steering angle θ) increases, because virtual motor torque $MT_0 \approx$ actual motor torque $MT_1$, nonlinearity N is approximately zero.

However, when vehicle 100 skids and actual motor torque $MT_1$ falls below virtual motor torque $MT_0$, that is, in a nonlinear area in which the actual lateral acceleration does not increase in proportion to the increase of turning angle δ (or steering angle θ), nonlinearity N increases from zero. When nonlinearity N has a greater value, a greater skid of vehicle 100 is indicated.

As described above, skid detection unit 530 determines whether or not vehicle 100 is undergoing skid, and calculates and outputs nonlinearity N, which is an index value of the magnitude of the skid.

In the process of calculating nonlinearity N, skid detection unit 530 may calculate nonlinearity N in accordance with Equation 4 in which friction component torque FT is added to conversion coefficient K, virtual lateral acceleration $G_1$, and actual motor torque $MT_1$ of turning motor 410.

$$N = K \times G_1 + FT - MT_1 \quad \text{[Equation 4]}$$

Skid detection unit 530 sets greater friction component torque FT for greater vehicle speed V.

When vehicle 100 is undergoing skid, based on nonlinearity N calculated by skid detection unit 530, skid reaction force torque calculation unit 540 performs intervention control of decreasing or increasing the reaction force torque from basic reaction force torque RTb.

Figure 3:
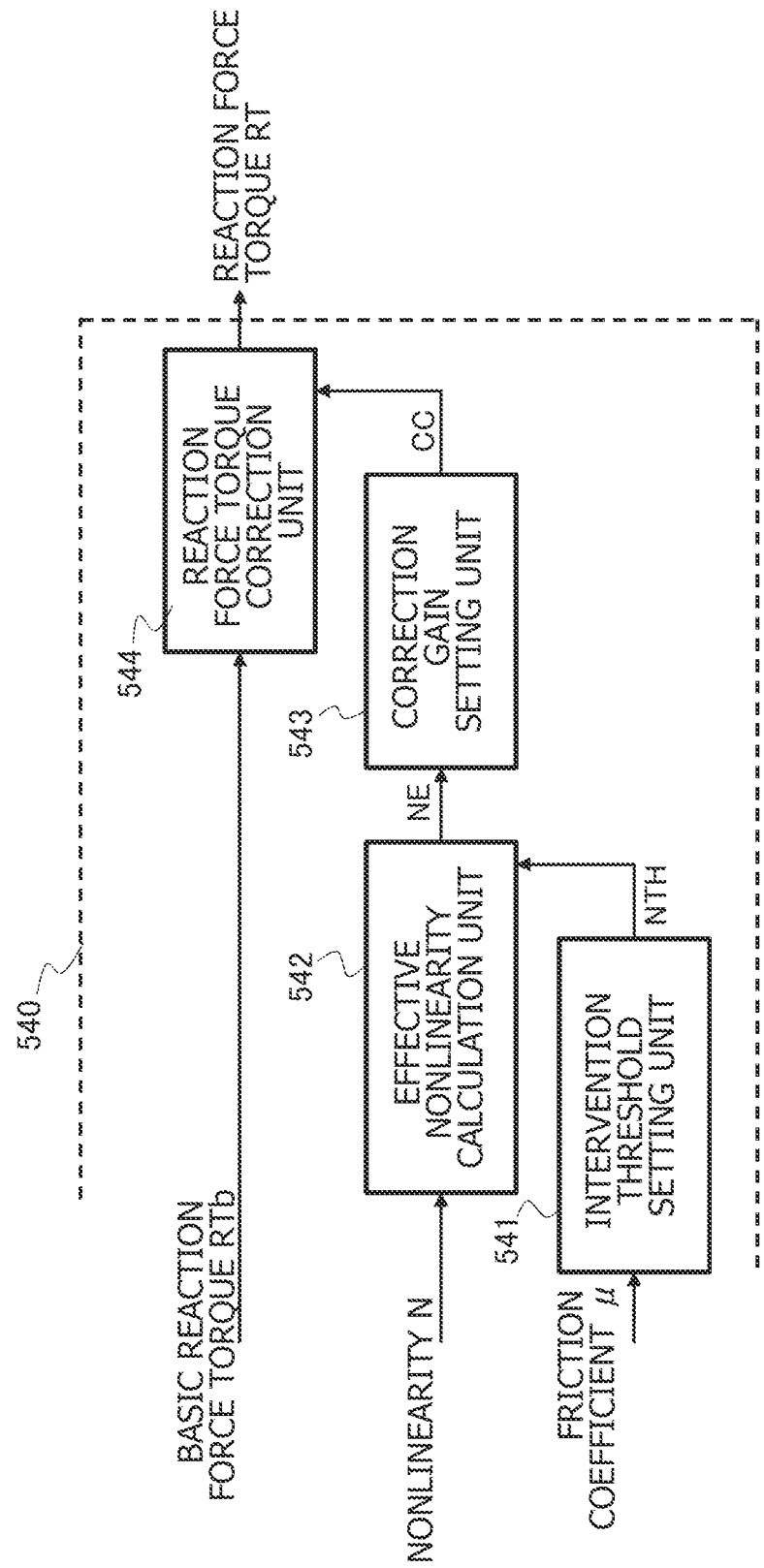
FIG. 3 is a functional block diagram of a skid reaction force torque calculation unit.

FIG. 3 is a functional block diagram of skid reaction force torque calculation unit 540.

Skid reaction force torque calculation unit 540 includes an intervention threshold setting unit 541, an effective nonlinearity calculation unit 542, a correction gain setting unit 543, and a reaction force torque correction unit 544.

Effective nonlinearity calculation unit 542 subtracts intervention threshold NTH from nonlinearity N calculated by skid detection unit 530, so as to obtain an effective nonlinearity NE (effective nonlinearity NE=nonlinearity N−intervention threshold NTH).

Intervention threshold NTH is a threshold for determining whether or not to perform the intervention control of decreasing or increasing the reaction force torque from basic reaction force torque RTb.

Intervention threshold setting unit 541 variably sets intervention threshold NTH based on friction coefficient μ of the road surface on which vehicle 100 runs.

Figure 4:
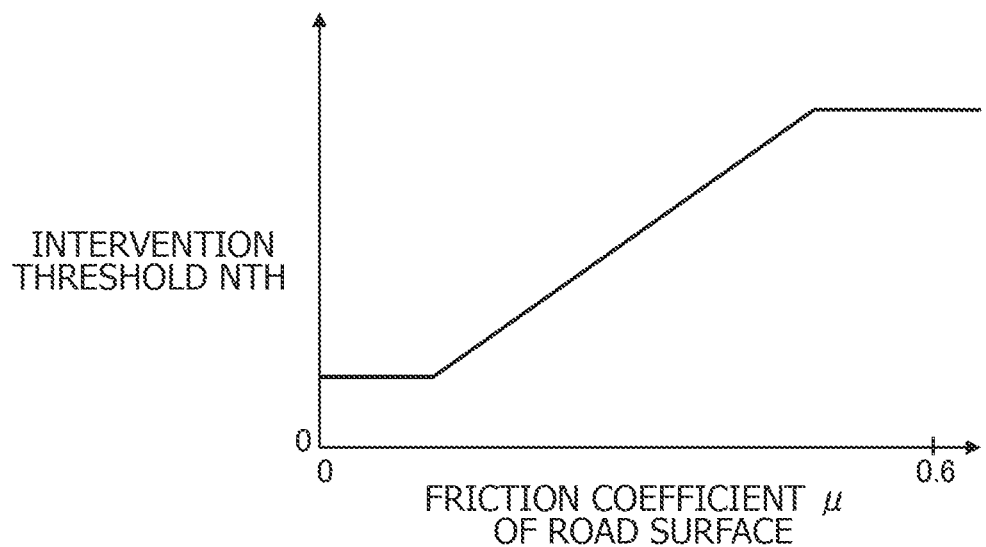
FIG. 4 is a line graph illustrating a relationship between a road surface friction coefficient and an intervention threshold.

FIG. 4 is a map used by intervention threshold setting unit 541 to obtain intervention threshold NTH from friction coefficient μ.

Intervention threshold NTH is set to be a greater value for greater friction coefficient μ.

That is, intervention threshold setting unit 541 sets larger nonlinearity N, based on which the reaction force torque intervention control is performed, for greater friction coefficient μ.

When vehicle 100 is running on a road surface of which friction coefficient μ is high, such as a dry road surface paved with asphalt, nonlinearity N could be erroneously detected, and consequently, the intervention control could be erroneously executed. However, by variably setting intervention threshold NTH based on friction coefficient μ, intervention threshold setting unit 541 prevents erroneous execution of the intervention control.

Control apparatus 500 may use the lateral acceleration detected by lateral acceleration sensor 630 when nonlinearity N represents its minimum value, as a physical amount indicating friction coefficient μ.

When estimating friction coefficient μ based on nonlinearity N, control apparatus 500 may detect a skid and estimate friction coefficient μ of the road surface based on nonlinearity N.

Other than estimating friction coefficient μ based on nonlinearity N and the actual lateral acceleration, control apparatus 500 may calculate friction coefficient μ of the road surface from the correlation between the drive force and acceleration of vehicle 100.

Alternatively, control apparatus 500 may acquire information about friction coefficient μ of the road surface by performing wireless communication with a node outside vehicle 100.

Correction gain setting unit 543 obtains correction gain CC used for correcting basic reaction force torque RTb, based on effective nonlinearity NE.

Figure 5:
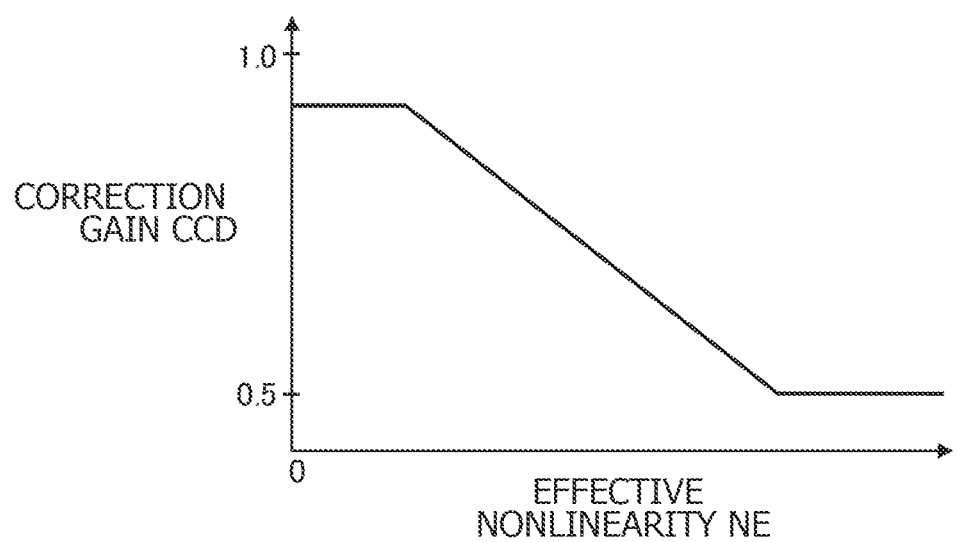
FIG. 5 is a line graph illustrating a relationship between an effective nonlinearity and a correction gain CCD.

FIG. 5 is a conversion table that correction gain setting unit 543 refers to when obtaining correction gain CCD (CCD<1.0) for decrease correction applied to basic reaction force torque RTb from effective nonlinearity NE.

Correction gain CCD is set to be a smaller value as vehicle 100 skids more and effective nonlinearity NE increases. In other words, the amount of reduction in reaction force torque from basic reaction force torque RTb is set to be a greater value as the difference between virtual motor torque $MT_0$ and actual motor torque $MT_1$ increases.

Because effective nonlinearity NE gradually increases from zero, it is preferable that correction gain CCD be gradually decreased as effective nonlinearity NE increases. In this way, the reaction force torque is prevented from rapidly changing.

Reaction force torque correction unit 544 multiplies basic reaction force torque RTb by correction gain CCD, to calculate reaction force torque RT as the skid reaction force torque (reaction force torque RT=basic reaction force torque RTb×correction gain CCD).

That is, when effective nonlinearity NE (in other words, the difference between the virtual motor torque and the actual motor torque) is greater, and when it is estimated that vehicle 100 is undergoing skid more, skid reaction force torque calculation unit 540 decreases the reaction force torque from basic reaction force torque RTb more, and outputs information about this the reaction force torque as information about the skid reaction force torque.

As described, when vehicle 100 is undergoing skid, by decreasing the reaction force torque from basic reaction force torque RTb, skid reaction force torque calculation unit 540 can simulate the reaction force torque generated by a conventional steering apparatus in which steering wheel 310 and front wheels 101 and 102 are mechanically connected together, and can appropriately notify the driver of the skid state of vehicle 100 via steering wheel 310.

In addition, skid detection unit 530 calculates nonlinearity N indicating the magnitude of a skid from virtual lateral acceleration $G_1$ and actual motor torque $MT_1$, without using a signal detected by lateral acceleration sensor 630. Thus, skid detection unit 530 can change the reaction force torque sensitively in response to generation of a skid.

That is, instead of detecting occurrence of a skid based on the actual lateral acceleration increased by the occurrence of the skid, skid detection unit 530 detects occurrence of a skid (in other words, a sign indicating increase in actual lateral acceleration) based on reduction in self-aligning torque from a non-skid state, the reduction being a condition that leads to increase in lateral acceleration. Thus, skid detection unit 530 can change the reaction force torque sensitively.

When a vehicle skids on a road surface of which friction coefficient μ is low, the actual lateral acceleration detected by lateral acceleration sensor 630 could be low and be hidden by errors.

Thus, when a skid is detected based on an actual lateral acceleration value detected by lateral acceleration sensor 630, no skid could be detected on such a road surface of which friction coefficient μ is low.

In contrast, when nonlinearity N is calculated from virtual lateral acceleration $G_1$ and actual motor torque $MT_1$, the gain with respect to a skid can be increased, and skid detection unit 530 can detect occurrence of a skid even on a road surface of which friction coefficient μ is low.

When a skid occurs, skid reaction force torque calculation unit 540 may increase the reaction force torque from basic reaction force torque RTb, instead of decreasing the reaction force torque from basic reaction force torque RTb.

When increasing the reaction force torque from basic reaction force torque RTb, skid reaction force torque calculation unit 540 obtains correction gain CCI (CCI>1.0) for increase correction applied to basic reaction force torque RTb from effective nonlinearity NE, multiplies basic reaction force torque RTb by correction gain CCI, and calculates reaction force torque RT as the skid reaction force torque (reaction force torque RT=basic reaction force torque RTb× correction gain CCI).

Figure 6:
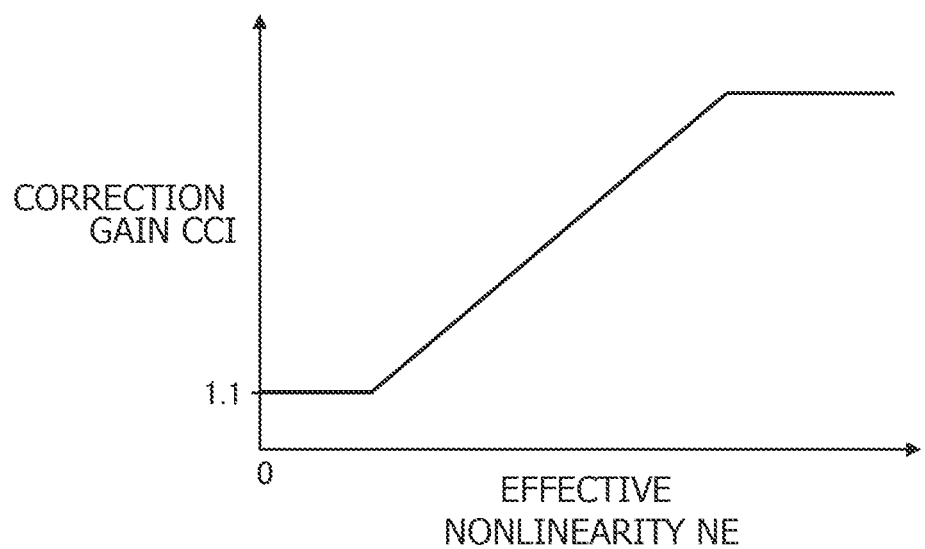
FIG. 6 is a line graph illustrating a relationship between the effective nonlinearity and a correction gain CCI.

FIG. 6 is a conversion table that skid reaction force torque calculation unit 540 refers to when obtaining correction gain CCI for increase correction from effective nonlinearity NE.

Correction gain CCI is set to be a greater value as effective nonlinearity NE increases.

That is, when effective nonlinearity NE (in other words, the difference between the virtual motor torque and the actual motor torque) is greater and when it is estimated that vehicle 100 is undergoing skid more, skid reaction force torque calculation unit 540 increases the skid reaction force torque from basic reaction force torque RTb more and outputs information about the skid reaction force torque.

As described above, when vehicle 100 is undergoing skid, by increasing the reaction force torque from basic reaction force torque RTb, skid reaction force torque calculation unit 540 can prevent the driver, who is not used to a skid state, from performing excessive steering operation, in other words, from excessively turning steering wheel 310.

Hereinafter, operational functions of coefficient update unit 560 will be described.

As expressed by Equation 1, conversion coefficient K updated by coefficient update unit 560 is a proportionality constant in a relational expression of actual lateral acceleration $G_0$ detected by lateral acceleration sensor 630 and motor torque $MT_0$ of turning motor 410 obtained when vehicle 100 is not undergoing skid.

A suitable value as this conversion coefficient K varies, for example, when grip performance varies due to exchange or abrasion of a tire of vehicle 100.

Thus, coefficient update unit 560 acquires actual lateral acceleration G and motor torque MT of turning motor 410 detected by lateral acceleration sensor 630 when vehicle 100 is not undergoing skid, substitutes the data acquired into Equation 1, and updates conversion coefficient K.

Coefficient update unit 560 may update and set a weighted average of conversion coefficient K newly calculated based on actual lateral acceleration G detected by lateral acceleration sensor 630 and motor torque MT of turning motor 410 and conversion coefficients K that have been used to calculate nonlinearity N, as conversion coefficient K used to calculate nonlinearity N.

Coefficient update unit 560 may calculate a plurality of conversion coefficients K based on actual lateral acceleration G detected by lateral acceleration sensor 630 and motor torque MT of turning motor 410, perform an averaging process on the data of the plurality of conversion coefficients K, and update and set a conversion coefficient K obtained by the averaging process as conversion coefficient K used to calculate nonlinearity N.

It is unlikely that a suitable value of conversion coefficient K varies greatly during a single trip of vehicle 100.

Thus, coefficient update unit 560 does not need to repeatedly update conversion coefficient K while vehicle 100 is not undergoing skid.

For example, coefficient update unit 560 may perform the process of updating conversion coefficient K only once or a plurality of times in a trip of vehicle 100.

Alternatively, coefficient update unit 560 may perform the process of updating conversion coefficient K each time vehicle 100 runs for a predetermined time or for a predetermined distance.

Figure 7:
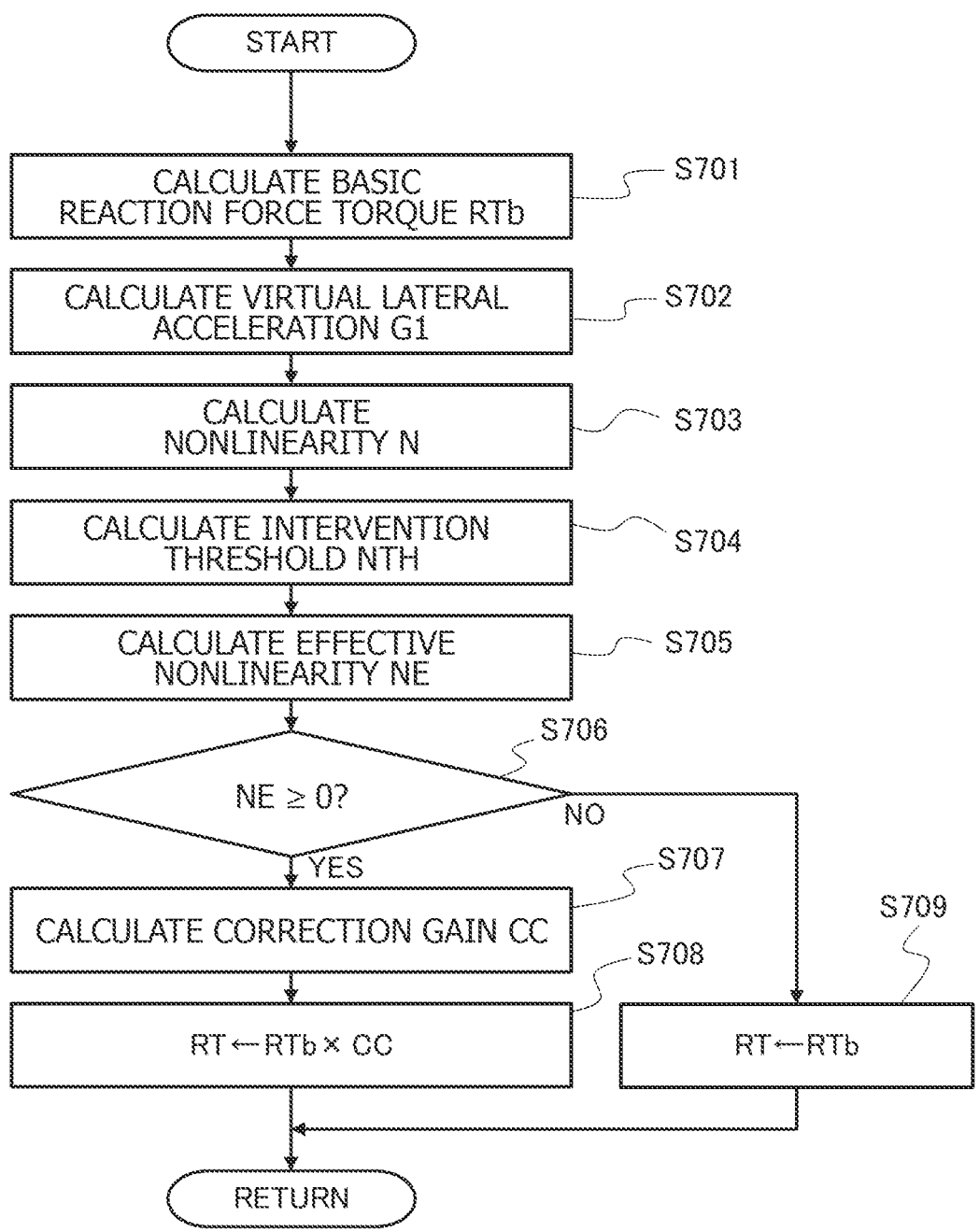
FIG. 7 is a flowchart illustrating a procedure of controlling reaction force torque.

FIG. 7 is a flowchart illustrating a procedure of reaction force torque control performed by control apparatus 500 (in other words, functions of skid detection unit 530 and skid reaction force torque calculation unit 540).

In step S701, control apparatus 500 calculates basic reaction force torque RTb from steering angle θ of steering wheel 310, etc.

Next, in step S702, control apparatus 500 calculates virtual lateral acceleration $G_1$ (in other words, the reference lateral acceleration) based on steering angle θ (or turning angle δ) and vehicle speed V (see Equation 3).

Next, in step S703, control apparatus 500 calculates nonlinearity N, which is an index value of the magnitude of a skid, based on virtual lateral acceleration $G_1$, conversion coefficient K, and actual motor torque $MT_1$ of turning motor 410 (see Equation 2).

Next, in step S704, control apparatus 500 calculates intervention threshold NTH for determining whether or not to perform the reaction force torque correction control, based on friction coefficient μ of the road surface on which vehicle 100 runs (see FIG. 4).

Next, in step S705, control apparatus 500 calculates effective nonlinearity NE by subtracting intervention threshold NTH from nonlinearity N (NE=N-NTH).

Next, in step S706, control apparatus 500 determines whether or not effective nonlinearity NE is zero or greater, that is, determines whether or not to perform the intervention control of decreasing or increasing the reaction force torque from basic reaction force torque RTb.

If effective nonlinearity NE is zero or greater, control apparatus 500 determines that vehicle 100 is undergoing skid and that the reaction force torque correction control (in other words, the intervention control) is needed to notify the driver of the skid state via steering wheel 310.

That is, if effective nonlinearity NE is zero or greater, the process proceeds from step S706 to step S707, and control apparatus 500 calculates correction gain CC used for correcting basic reaction force torque RTb, based on effective nonlinearity NE (see FIGS. 5 and 6).

Next, in step S708, control apparatus 500 multiplies basic reaction force torque RTb by correction gain CC to calculate target reaction force torque RT (RT=RTb×CC), and outputs a control signal to reaction force generation apparatus 300 such that reaction force generation apparatus 300 can generate target reaction force torque RT (RT<RTb or RT>RTb).

If effective nonlinearity NE is a negative value, control apparatus 500 determines that vehicle 100 is not undergoing skid and that the reaction force torque correction control for notifying the driver of a skid state via steering wheel 310 is not needed.

That is, if effective nonlinearity NE is a negative value, the process proceeds from step S706 to step S709, and control apparatus 500 sets basic reaction force torque RTb as target reaction force torque RT, and outputs a control signal to reaction force generation apparatus 300 such that reaction force generation apparatus 300 can generate target reaction force torque RT (RT=RTb).

Figure 8:
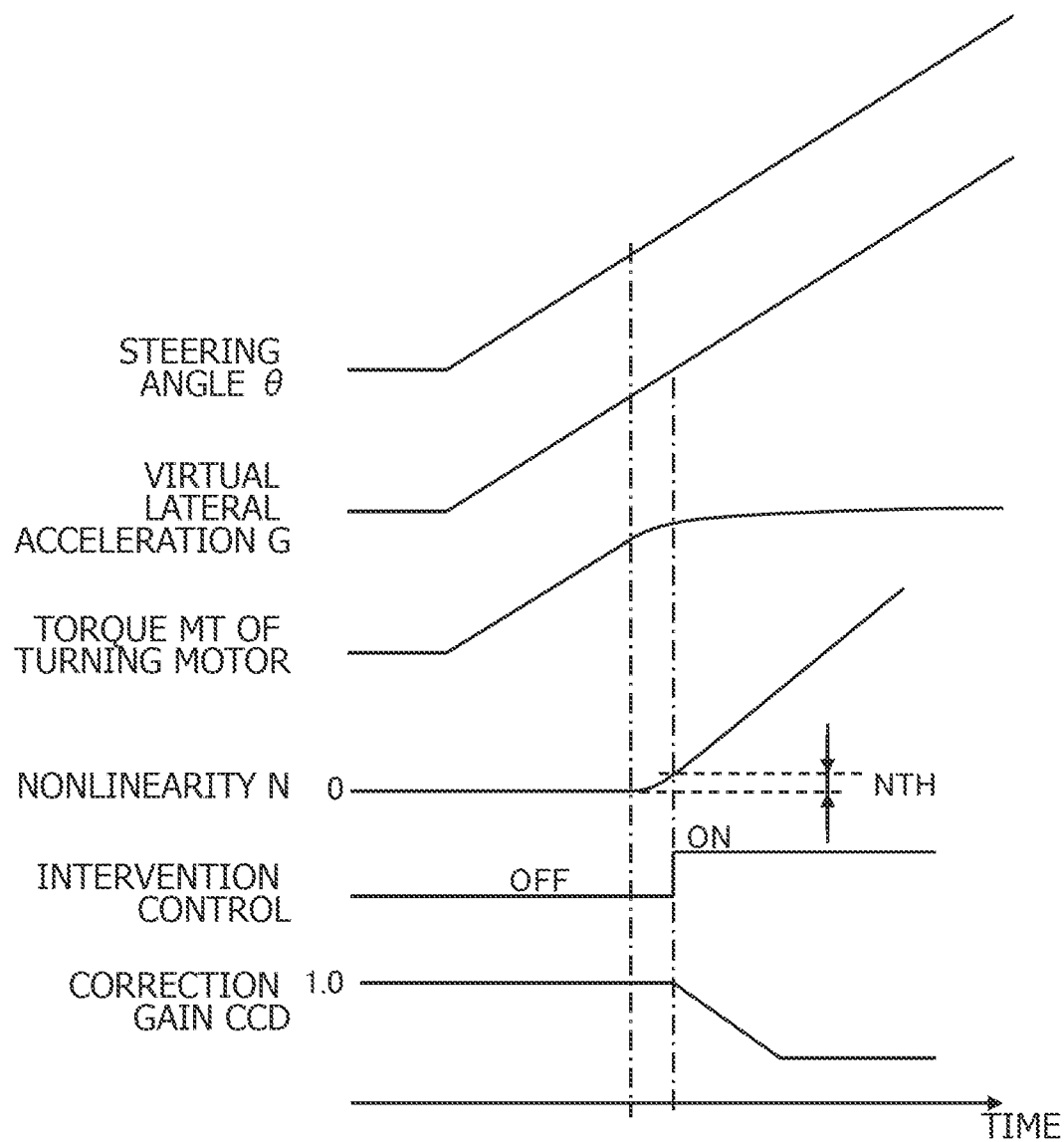
FIG. 8 is a time chart illustrating correction of the reaction force torque.

FIG. 8 is a time chart illustrating determination of a skid of vehicle 100 and correction of the reaction force torque by control apparatus 500. Specifically, FIG. 8 illustrates change in steering angle θ, virtual lateral acceleration $G_1$, actual motor torque $MT_1$, nonlinearity N, on/off state of the reaction force torque correction control, and correction gain CCD for decrease correction over time.

FIG. 8 illustrates a case in which vehicle 100 runs on a road surface of which friction coefficient is low, such as a compacted snow road, and in which steering angle θ increases at a constant rate.

Because this case assumes that vehicle 100 is not undergoing skid at first, virtual lateral acceleration $G_1$ increases as steering angle θ increases.

When vehicle 100 is not undergoing skid, as with the case with virtual lateral acceleration $G_1$, actual motor torque $MT_1$ also increases as the self-aligning torque is increased by the increase of the steering angle θ.

In this state in which vehicle 100 is not undergoing skid, that is, in which actual motor torque $MT_1$ increases as steering angle θ increases, because motor torque MT estimated from virtual lateral acceleration $G_1$ approximates actual motor torque $MT_1$, nonlinearity N is maintained at approximately zero.

When nonlinearity N is maintained at approximately zero, the reaction force torque correction control is maintained in an off-state, and correction gain CCD maintains 1.0 corresponding to the state in which the reaction force torque is not corrected.

However, once vehicle 100 begins to skid, actual motor torque $MT_1$ stops increasing in proportion to the increase in steering angle θ.

In this state, because actual motor torque $MT_1$ is less than motor torque MT estimated from virtual lateral acceleration $G_1$, nonlinearity N beings to increase.

Next, when nonlinearity N exceeds intervention threshold NTH, the reaction force torque correction control is switched to an on-state, correction gain CCD gradually decreases from 1.0 as nonlinearity N (or effective nonlinearity NE) increases. Target reaction force torque RT is decreased more from basic reaction force torque RTb as nonlinearity N (or effective nonlinearity NE) increases.

The individual technical concepts described in the above-described example can be appropriately combined and used, as long as there is no conflict.

In addition, although the present invention has thus been described in detail with reference to a preferable example, it will be apparent to those skilled in the art that various types of modifications are possible, based on the basic technical concepts and teachings of the present invention.

For example, the correction process for decreasing or increasing the reaction force torque from the basic reaction force torque is not limited to the decrease or increase correction based on multiplication of correction gain CC, which is a correction coefficient. In the correction process, correction torque based on nonlinearity N (or effective nonlinearity NE) may be subtracted from or added to the basic reaction force torque.

Alternatively, control apparatus 500 may include a first control apparatus that controls reaction force generation apparatus 300, and a second control apparatus that controls steering apparatus 400 separately.

REFERENCE SYMBOL LIST

100 Vehicle
101, 102 Front wheel (steered road wheel)
200 Steer-by-wire system
200A Steer-by-wire
300 Reaction force generation apparatus
310 Steering wheel
330 Reaction force motor
400 Steering apparatus
410 Turning motor
500 Control apparatus

The invention claimed is:

1. A steer-by-wire system installed in a vehicle, the steer-by-wire system comprising:
a steering apparatus that is capable of steering steered road wheels through an operation of a turning motor;
a reaction force generation apparatus that is capable of adding a reaction force torque to a steering wheel through an operation of a reaction force motor; and
a control apparatus that controls the steering apparatus and the reaction force generation apparatus,
wherein the steering apparatus and the reaction force generation apparatus are mechanically separate from each other,
wherein the control apparatus includes a skid detection unit that detects whether or not the vehicle is undergoing skid,
wherein, when the vehicle is undergoing skid, the control apparatus calculates a skid reaction force torque by decreasing the reaction force torque from a basic reaction force torque calculated from a steering angle of the steering wheel by an amount of reduction based on a virtual lateral acceleration calculated based on the steering angle and a vehicle speed of the vehicle, and
wherein the control apparatus outputs a control signal to the reaction force generation apparatus such that the reaction force generation apparatus generates the skid reaction force torque.

2. The steer-by-wire system according to claim 1, wherein the control apparatus calculates a virtual motor torque, which is a motor torque of the turning motor when the vehicle is not undergoing skid, based on the virtual lateral acceleration, and causes the reaction force generation apparatus to output the skid reaction force torque calculated by decreasing the reaction force torque from the basic reaction force torque more when a difference between the virtual motor torque and an actual motor torque of the turning motor is greater.

3. The steer-by-wire system according to claim 2, wherein the skid detection unit detects that the vehicle is undergoing skid when the difference between the virtual motor torque and the actual motor torque is greater than a threshold.

4. The steer-by-wire system according to claim 3, wherein the skid detection unit varies the threshold based on a friction coefficient of a road surface on which the vehicle runs.

5. The steer-by-wire system according to claim 2, comprising a lateral acceleration sensor that detects an actual lateral acceleration of the vehicle, wherein the control apparatus calculates a conversion coefficient for calculating the virtual motor torque from the virtual lateral acceleration, based on the actual motor torque of the turning motor and the actual lateral acceleration detected by the lateral acceleration sensor in a state in which the vehicle is not undergoing skid.

6. The steer-by-wire system according to claim 2, wherein the control apparatus includes a conversion table indicating a relationship between the difference between the virtual motor torque and the actual motor torque of the turning motor and an amount of reduction of the reaction force torque, calculates an amount that is decreased from the basic reaction force torque by referring to the conversion table, and causes the reaction force generation apparatus to output the skid reaction force torque.

7. A steer-by-wire control apparatus, controlling a steer-by-wire system which includes a steering apparatus that is capable of steering steered road wheels through an operation of a turning motor and a reaction force generation apparatus that is capable of adding a reaction force torque to a steering wheel through an operation of a reaction force motor and in which the steering apparatus and the reaction force generation apparatus are mechanically separate from each other, the steer-by-wire control apparatus comprising:
a skid detection unit that detects whether or not a vehicle is undergoing skid,
a skid reaction force torque calculation unit that calculates, when the vehicle is undergoing skid, a skid reaction force torque by decreasing the reaction force torque from a basic reaction force torque calculated from a steering angle of the steering wheel by an amount of reduction based on a virtual lateral acceleration calculated based on the steering angle and a vehicle speed of the vehicle, and
a signal output unit that outputs a control signal to the reaction force generation apparatus such that the reaction force generation apparatus generates the skid reaction force torque.

8. The steer-by-wire control apparatus according to claim 7, wherein the skid reaction force torque calculation unit calculates a virtual motor torque, which is a motor torque of the turning motor when the vehicle is not undergoing skid, based on the virtual lateral acceleration, and calculates the skid reaction force torque by decreasing the reaction force torque from the basic reaction force torque more when a difference between the virtual motor torque and an actual motor torque of the turning motor is greater.

9. A steer-by-wire control method for controlling a steer-by-wire system which includes a steering apparatus that is capable of steering steered road wheels through an operation of a turning motor and a reaction force generation apparatus that is capable of adding a reaction force torque to a steering wheel through an operation of a reaction force motor and in which the steering apparatus and the reaction force generation apparatus are mechanically separate from each other, the steer-by-wire control method comprising:

calculating, when a vehicle is undergoing skid, a skid reaction force torque by decreasing the reaction force torque from a basic reaction force torque calculated from a steering angle of the steering wheel by an amount of reduction based on a virtual lateral acceleration calculated based on the steering angle and a vehicle speed of the vehicle, and outputting a control signal to the reaction force generation apparatus such that the reaction force generation apparatus generates the skid reaction force torque.

10. The steer-by-wire control method according to claim 9, comprising:

calculating a virtual motor torque, which is a motor torque of the turning motor when the vehicle is not undergoing skid, based on the virtual lateral acceleration; and calculating the skid reaction force torque by decreasing the reaction force torque from the basic reaction force torque more when a difference between the virtual motor torque and an actual motor torque of the turning motor is greater.

\* \* \* \* \*